UNITED STATES PATENT OFFICE.

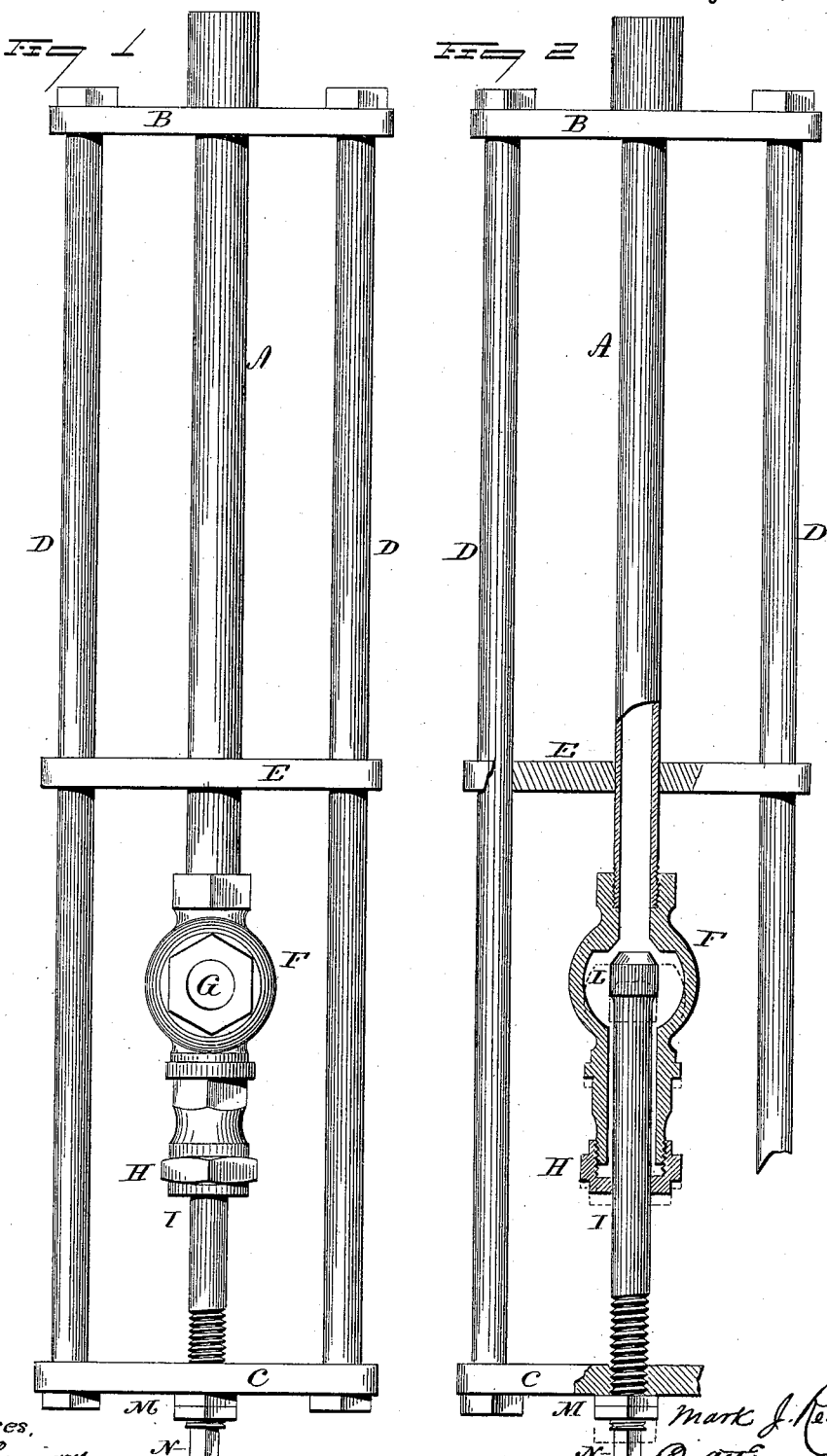

MARK J. REDMOND, OF NAUGATUCK, CONNECTICUT.

STEAM-TRAP.

SPECIFICATION forming part of Letters Patent No. 323,204, dated July 28, 1885.

Application filed October 13, 1884. Renewed June 27, 1885. (No model.)

*To all whom it may concern:*

Be it known that I, MARK J. REDMOND, of Naugatuck, in the county of New Haven and State of Connecticut, have invented a new Improvement in Steam-Traps; and I do hereby declare the following, when taken in connection with accompanying drawings, and the letters of reference marked thereon, to be a full, clear, and exact description of the same, and which said drawings constitute part of this specification, and represent, in—

Figure 1, a side view of the trap complete; Fig. 2, the same, showing vertical section through the valve-chamber.

This invention relates to an improvement in that class of steam-traps in which a valve is arranged to be closed by the expansion of some portion of the apparatus which is subject to the influence of hot steam, whereby, under such movement, the part is expanded to close the valve until such time as this portion shall be subject to water arising from condensation, and whereby the temperature of the said part will be reduced, causing it to contract and open the valve. But a slight opening is permissible at the valve under such expansion and contraction; and it frequently occurs that the opening becomes clogged by sediment in the water, and to relieve such clogging it is necessary to detach or open the apparatus, which necessitates cutting off the steam from the trap.

The object of my invention is the construction of a trap in such manner that it may be cleared or "blowed off" at any time without the necessity of cutting off the steam or disconnecting the apparatus; and it consists in a valve-chamber attached to the end of the steam-pipe which is to form the trap, the said pipe being arranged to expand or contract accordingly as it is filled with steam or water, combined with an adjustable valve-stem whereby the extent of expansion or contraction required may be varied, or the valve opened wide for blowing-off, as occasion may require, and as more fully hereinafter described.

A represents the steam-pipe, one end of which is fixed, say, in cross-bar B. The cross-bar B is connected to a second cross-bar, C, by fixed rods D D, parallel with the pipe A. The pipe A extends down from its fixed cross-bar B through a cross-head, E, arranged on the rods near the end of the pipe and so as to support and maintain the pipe A in its position parallel with the rods D D. To the lower end of the pipe A a valve-chamber, F, is attached, and into which the pipe A opens. From this valve-chamber is an opening or passage, G, outward. Through a stuffing-box, H, on the lower end of the valve the valve-spindle I passes, the said valve-spindle adjustably fixed in the lower cross-bar, C, and carries at its upper end the valve L, constructed to fit the seat in the valve-chamber. The spindle is screw-threaded through a corresponding hole in the bar C, and so that by turning the spindle the valve may be made to approach or recede from its seat. Below the cross-bar C jam-nuts M are applied, to bear against the bar C to hold and prevent the accidental turning of the spindle I. The spindle itself is fitted at some point with an angular prong, N, by which it may be conveniently turned. This completes the construction. The trap is arranged so that hot steam may enter the pipe A and flow into the valve-chamber. The heat of the steam causes the pipe A to expand, and its upper end being fixed such expansion causes the valve-chamber to approach the valve. The valve is adjusted in such relation to the valve-seat that under the expansion of the steam the seat will approach and rest upon the valve so as to close the passage from the steam-pipe A into the valve-chamber. In this condition no steam can escape. The valve is adjusted by loosening the jam-nuts M and turning the spindle to bring the valve to a bearing upon its seat when the pipe A shall have been expanded to its full extent under the heat of the steam. When this proper position of the valve has been made, the first nut is screwed hard up against the cross-bar C, and then the second nut hard against the first, to "jam" the two, so as to prevent accidental movement of the nuts on the spindle. The opening into the valve-chamber will remain closed so long as the steam be present in the pipe; but as condensation occurs, and the water of condensation takes the place of the steam in the pipe A, the temperature of the water will be so much below that of the steam, which caused the expansion of the pipe, as to produce contraction of the pipe and take the valve-seat from the valve, as indicated in Fig. 2, thus opening the passage from the pipe A into the valve-chamber, through which the water of condensation will flow, and escape therefrom through the passage G. Upon the escape of the water steam again fills the pipe A, causing it to expand and close the valve as before, and so will continue to act under the expansion of the steam and contraction of the water of condensation, the trap automatically clearing itself.

At any time when the trap shall have become clogged by sediment or otherwise, or shall be supposed to be so, the valve-spindle I is turned to unscrew it through the bar C and draw the valve downward, as indicated in broken lines, Fig. 2, thus opening an extensive passage from the pipe A into the valve-chamber, sufficient to permit so free flow of steam through the valve chamber and the exit G as to clear the trap from any sediment or obstruction which may happen to be therein; and when the trap is thus cleared or blowed off, then the spindle is returned until the nuts bring up against the bar C, the nuts insuring the same relative position of the valve to its seat as before it was opened for blowing off. The trap may therefore be blowed off or cleaned without detaching any of its parts or cutting off the steam—that is, it may be done while in full practical operation without interruption.

I am aware that steam-traps have heretofore been constructed consisting of an expansible tube arranged so that the passage through it may be stopped by a stationary valve, and the passage opened by the contraction of the tube, and therefore do not claim, broadly, such a construction.

I am also aware that an expansible steam-pipe has been arranged in connection with a system of levers and rods whereby the valve may be automatically opened and closed, the valve-spindle having a similar relation to the valve as in this application; but I do not claim such construction, the essential feature of my invention being the rigidly-connected supports for the pipe and valve-stem, and the arrangement of the valve-stem in one of those supports whereby it is made adjustable with relation to the valve, and when once set may be opened and closed, and in closing brought back to the same position from which it was opened with certainty.

I claim—

The combination of the two cross-bars B C, parallel rods D D, rigidly connecting the said cross-bars B C, the steam-pipe A, one end fixed in the one cross-bar, B, and extending toward the other cross-bar, C, the valve-chamber F, rigidly fixed to the lower end of the steam-pipe A, the said steam-pipe opening into the said valve-chamber, the spindle I, screw-threaded through the lower cross-bar, C, and extending up into the valve-chamber, carrying at its upper end the valve L, and the jam-nuts M on the screw-threaded portion of the spindle below the cross-bar C, substantially as and for the purpose described.

MARK J. REDMOND.

Witnesses:
JOHN M. SWEENY,
CHARLES GALLERTON.